United States Patent [19]

Genco et al.

[11] Patent Number: 4,633,110
[45] Date of Patent: Dec. 30, 1986

[54] MOTOR WITH STATOR ON PRINTED CIRCUIT ASSEMBLY

[75] Inventors: Jerry J. Genco, Kingston; Norman Smith, Woodstock, both of N.Y.

[73] Assignee: Rotron, Inc., Saugerties, N.Y.

[21] Appl. No.: 714,099

[22] Filed: Mar. 20, 1985

[51] Int. Cl.[4] .......................... H02K 3/50; H02K 21/22
[52] U.S. Cl. .................................... 310/71; 310/67 R; 310/68 R; 310/91
[58] Field of Search ............... 310/42, 43, 67 R, 68 R, 310/68 D, 71, 156, 238, 242, 265, 268, 91; 339/17 C, 221 R

[56] References Cited

U.S. PATENT DOCUMENTS

| 3,043,970 | 7/1962 | Hatten et al. | 310/91 |
|---|---|---|---|
| 4,099,104 | 7/1978 | Müller . | |
| 4,115,715 | 9/1978 | Müller | 310/67 R |
| 4,311,933 | 1/1982 | Riggs et al. | 310/68 R |
| 4,361,773 | 11/1982 | Mokrzycki | 310/71 |
| 4,408,817 | 10/1983 | Mattis | 339/17 C |
| 4,420,702 | 12/1983 | Mixner | 310/42 |
| 4,513,214 | 4/1985 | Dieringer | 310/71 |
| 4,521,706 | 6/1985 | Kudelski et al. | 310/67 R |
| 4,540,906 | 9/1985 | Blom | 310/42 |

FOREIGN PATENT DOCUMENTS 2027285 2/1980 United Kingdom ............ 310/67 R

Primary Examiner—Patrick R. Salce
Assistant Examiner—D. L. Rebsch
Attorney, Agent, or Firm—Brumbaugh, Graves, Donohue & Raymond

[57] ABSTRACT

A motor including a stator winding energization circuit on a printed circuit board. Terminals secured to the stator have stator winding ends welded thereto. For purpose of mechanically and electrically connecting the stator and the PC board, the stator is connected to the board in the manner of circuit components, by insertion of the terminals in conforming slots on the board and by wave soldering the tips of the terminals to the board's conductors.

12 Claims, 5 Drawing Figures

U.S. Patent  Dec. 30, 1986  4,633,110
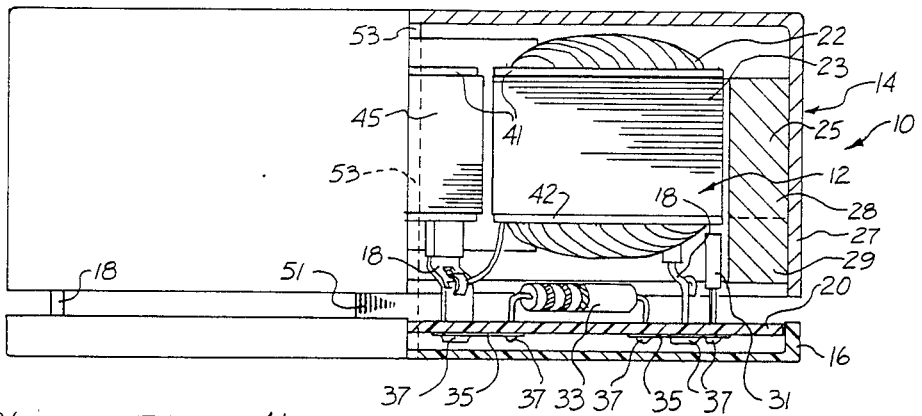
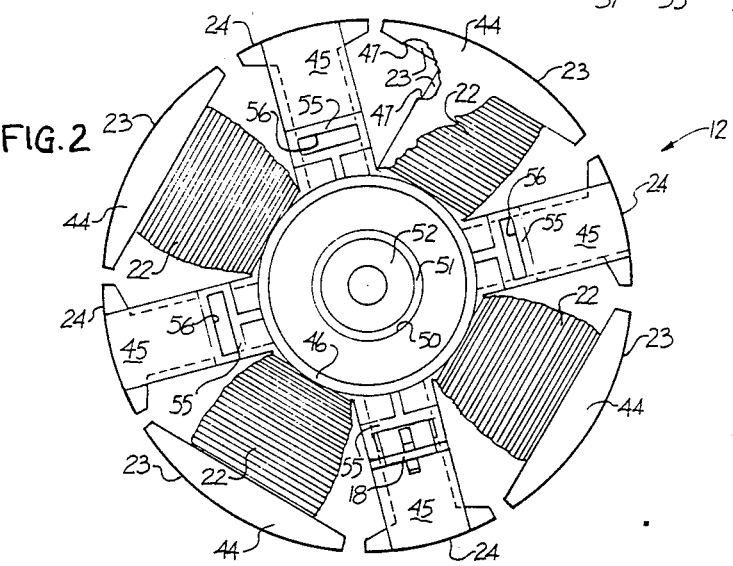
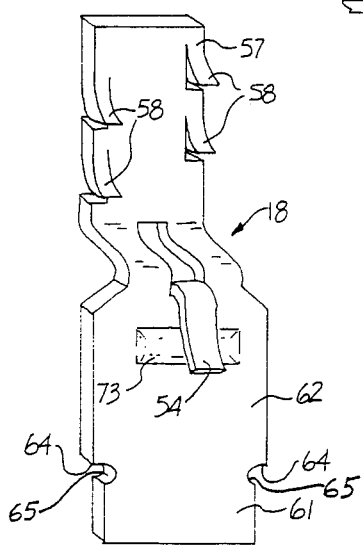
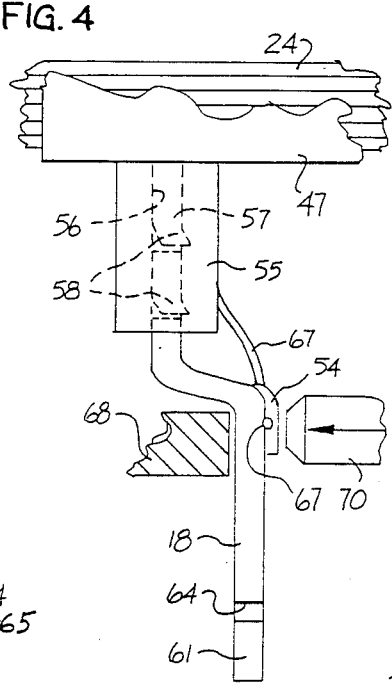
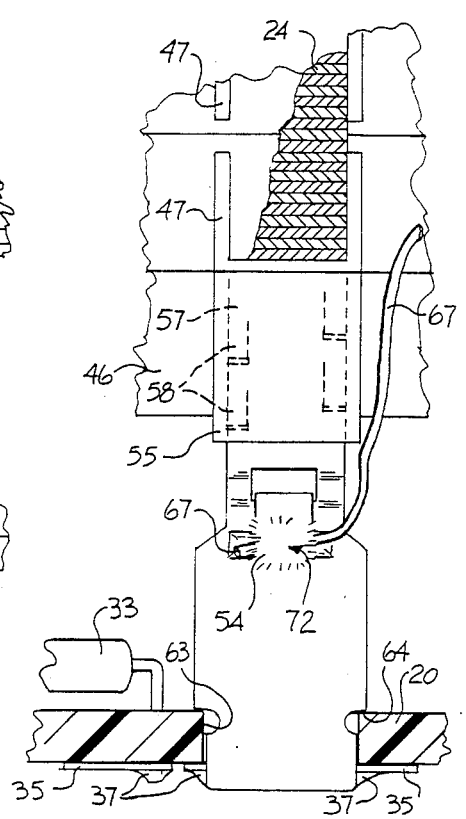

MOTOR WITH STATOR ON PRINTED CIRCUIT ASSEMBLY

BACKGROUND OF THE INVENTION

The present invention relates generally to motors such as DC brushless motors that have a printed circuit ("PC") board carrying a motor energization circuit, and more particularly to the manner of assembling the stator and PC board.

The manufacture and sale of small motors is a highly price competitive industry. Improvements in the manufacturing process which result in cost savings per motor will result in significant commercial advantage in the marketplace. Typically, the stator of a brushless DC motor is mechanically mounted to the PC board by means of motor support posts or lugs and is separately electrically connected to the PC board by soldering winding ends to connection points on the board. The mechanical mounting and electrical connection is ordinarily done by hand, which is not only time consuming but costly. Even if done automatically, the separate mounting and electrical connection of the stator and PC board, independent of soldering the energization circuit components to the board, requires too many time consuming steps.

It will be appreciated from the foregoing that a stator simultaneously mechanically mounted and electrically connected to a PC board in the manner of a circuit component either manually or, preferably, with automatic equipment such as wave soldering equipment, is a significant and valuable improvement contributing to lower assembly cost and greater reliability.

SUMMARY OF THE INVENTION

In accordance with the invention, a motor includes a stator core having at least one stator winding and terminals secured to the stator core, the terminals both mechanically mounting and electrically connecting the stator to a PC board carrying the motor energization circuit. Each end of each stator winding is electrically connected to a terminal.

By inserting the terminals into conforming holes in the PC board, and by soldering the terminal means to the printed copper conductors of the board, either manually or, preferably, by an automatic soldering process, the motor is mechanically mounted and the stator windings are electrically coupled to the circuit in a single step. Because automatic equipment is presently available for mechanically mounting components, ordinarily circuit components, such as integrated circuits, resistors, capacitors, etc., to PC boards, and because the soldering can be performed automatically by a wave soldering process, the mechanical and electrical connections of the stator to the appropriate conductors on the board can be done automatically and in one step. Preferably the soldering of the stator terminals and the soldering of the circuit components in place is accomplished in one wave soldering step. As a result, the stator and board are mechanically connected, and the stator winding ends are electrically connected to the PC board circuit in less time, with uniform quality, and at less expense. In short, the stator itself is treated as another PC board component and can be soldered to the PC board at the same time as all other circuit components. This is very unlike prior practice where, only after the PC board was completed, it was mounted on the stator. In other words, previously, because the printed circuit was (correctly) considered a component to be "installed" in the motor, and because neither the motor nor its stator was viewed as a circuit component, but as the device that the circuit served, no thought was given to treating the stator as a component to be mounted on the board for the purpose of mechanical motor assembly and electrical connection. Hence the stator was not configured for this purpose, e.g. by providing terminals readily wave soldered in place like the leads or pins of circuit components, and, in the case of a brushless DC motor, like the leads of a Hall device used to sense rotor position to control commutation of the windings via the energization circuit.

More particularly, the motor's stator includes a lower insulator of plastic that, in addition to insulating the windings from the stator stack, has sockets formed thereon to receive the terminals snugly in place. The terminals thus extend from the bottom surface of the lower support member. Each terminal preferably includes a tang. Ends of the stator winding are brought under the tang on the appropriate terminals. The winding ends are welded to the terminals, the tang being crimped onto the underlying wire and fused therewith by the, preferably automatic, welding equipment. To further secure the terminals within the sockets on the stator insulator, each terminal end includes a plurality of barbs extending opposite the direction the terminal is inserted. The terminals are configured to seat on the board with their tip just projecting from the remote side thereof where soldering occurs. The welding of the winding ends is easily accomplished and in known fashion, for example by using techniques and equipment previously employed to weld winding ends to tangs on commutator bars or rings of motors or other rotary components.

Once combined, the board and stator stack are handled as a single component of the motor. In the case of an inverted motor, the stator and board are mounted in a support with a central cylindrical shaft projecting upward through a central hole in the board and a central hole in the stator stack as is conventional. Bearings in the cylindrical shaft then receive the shaft of an external rotor. If the motor is a brushless DC motor, mounting of the rotor brings a commutation magnet pattern into alignment with a Hall device located on the circuit board.

Other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

FIG. 1 is a view, partly in elevation and partly in section, of an inverted, four-pole brushless DC motor in which the stator is connected by terminals to a printed circuit board.

FIG. 2 is a bottom view of the stator of the motor of FIG. 1 and has parts removed or broken away for clarity.

FIG. 3 is a perspective view of a terminal for connecting the printed circuit board and stator of FIGS. 1 and 2.

FIG. 4 is a fragmentary side elevation view of the terminal of FIG. 3 in place in a socket secured to the stator and schematically illustrates the welding of the winding end or lead to the terminal.

FIG. 5 is a fragmentary front elevation view of the terminal of FIGS. 3 and 4 in place in the socket with a winding end welded in place and the terminal installed and soldered to the printed circuit.

DESCRIPTION OF THE PREFERRED EMBODIMENT

Referring to the drawings, in FIG. 1 there is shown a brushless DC motor 10, comprising a laminated stator core 12, a rotor 14, a lower support member 16 and a plurality of terminals 18, which can be easily and readily connected to a PC board 20. The motor includes stator windings 22 wound on the four main stator poles 23 (FIG. 2). Four interpoles 24 are located between the main poles. A rotor permanent magnet 25 (FIG. 1) is affixed in a metallic cup 27 that forms the back iron of the rotor. The magnet 25 has a field section 28 and a commutation section 29. The field magnet has radially magnetized segments appropriately arranged to interact with the poles of the stator core to develop torque. The commutation magnet section is aligned with a Hall switch 31 supported on the PC board 20 and electrically connected with a circuit on the board for controlling energization of the windings 22 at appropriate points in the rotation of the rotor 14. The commutation magnet section 29 is magnetized radially in segments that, as they pass the Hall switch, cause the Hall switch to switch states, energizing and deenergizing the particular windings via the circuit on the board. Appropriate magnetization patterns for the field segments and commutation segments are disclosed throughout the art and do not form a part of this invention. Likewise, numerous energization circuits are described throughout the art and the particular circuit is not a part of this invention. For simplicity one circuit element 33 is shown connected to the PC board. The copper conductors 35 of the board can be seen in FIG. 1 connected by solder 37 to the leads of the circuit element 33 and the ends of the terminals 18.

The stator core 12 has upper and lower insulators 41 and 42. These conform to the stator laminations that make up the core 12 and insulate the windings 22 from the laminations. The lower insulator 42 is best seen in the illustration of the stator in FIG. 2. The lower insulator has main pole insulating projections 44 extending to the ends of the main poles 23 and interpole projections 45 extending along the interpoles 24. These projections 44 and 45 radiate from a central ring-like flange 46. Vertical walls 47 of the insulator extend along edges of the stack of laminations. (See also FIGS. 4 and 5) In all of the above respects the upper insulator is similar, with main and interpole projections, and vertical walls that reach down to meet the upward reaching vertical walls of the lower insulator.

A central opening 50 through the stator core 12 receives a cylindrical sleeve 51. This sleeve passes through a central opening (not shown) in the PC board 20 and is affixed in a central opening (not shown) in the support member 16. The sleeve 51 secures the stator in place on the support member 16. Bearings 52 (FIG. 2) receive a shaft 53 (FIG. 1) secured to the cup 27 of the rotor 14. A similar bearing in the support member 16 can receive the end of the rotor shaft 53.

The terminals 18 are attached to the lower insulator 42, extend outward and downward as shown, and attach the motor to the PC board. Each terminal 18 is rigid and electrically conductive and includes a tang 54 (FIGS. 3-5) for electrically connecting an end of the stator winding 22 to the terminal.

More particularly, and with reference to FIGS. 1 and 2, the lower insulator 42 is molded from an insulating plastic. Unlike the upper insulator 41, the lower insulator includes four downwardly projecting sockets 55 extending from the bottom surface of the insulator's interpole projections 45. These receive the four terminals 18, only one of which is shown in FIG. 2. Each socket 55 includes an opening 56 corresponding to the size and configuration of an end 57 (FIG. 3) of a terminal, so that a terminal is snugly received (FIGS. 4 and 5) when inserted into a socket opening. Barbs 58 on the terminal ends 57 prevent dislocation of the terminal.

Best seen in FIGS. 3 to 5, the tangs 54 may be formed by partially punched out sections of each terminal bent to extend outward from the terminals. The barbs 58 can likewise be partially cut out and bent to extend opposite the direction that the terminal ends 57 are inserted into openings 56 in the sockets. A lower end 61 of each terminal 18 is of slightly smaller width than a neighboring medial portion 62 and fits into a conforming opening 63 provided in the circuit board 20 (FIG. 5). Shoulders 64 between the end 61 and the portion 62 seat on the upper surface of the board 20 to locate the terminal correctly with respect to the board. Cutouts 65 are also formed at lateral edges of the terminal.

In FIG. 4, connection of a winding end or lead 67 to the terminal 18 is shown. A known welding arrangement provides fusion of the copper wire of the winding end and the metal of the terminal for instantaneous, secure and electrically conductive connection of the winding to the terminal. The end 67 of the winding is located under the tang 54 on the terminal 18. A conductive backing electrode 68, schematically illustrated in FIG. 4, is brought into place behind the electrode. A welding tip 70 applies pressure and sufficient electrical current through the tang 54, through the winding end 67, and through the terminal portion 18 to the electrode 68 to crimp the wire of the winding end in place and to effect a weld as indicated at 72 in FIG. 5. In known manner, a slight depression 73 beneath the winding end 67 prevents the tang 54 from shearing the wire thereunder.

Like the components (e.g. circuit element 33) of the circuitry carried by the board 20, the terminals 18 of the stator 12 are inserted in their slots 63 in the board and conventional soldering, typically a known wave soldering technique, is used to apply solder connections 37 between the ends 61 of the terminals and the conductors 35, just as the circuit elements have been connected to their appropriate conductors 35.

Unlike prior practice, for the purpose of electrical connection of the windings to the control circuitry, and for the purpose of physically joining the circuit board and stator, by this invention the stator is completed and then mounted as a circuit element, rather than the device that the circuit serves, and to which the circuit is ultimately to be connected. This, then, furthers the objective of rapid, certain, and automated motor construction.

With the stator 12 and circuit board 20 thus combined, mounting these on the support 16 and its shaft 51 is easily accomplished, and the angular relationship of the stator and the commutation controlling Hall switch 31 is already correctly fixed.

Although the invention has been described in detail with reference to its presently preferred embodiment, it will be understood by one of ordinary skill in the art that various modifications can be made without departing from the spirit and the scope of the invention, as set forth in the appended claims.

We claim:

1. A motor comprising:
a stator core;
a rotor mounted for rotation relative to the stator core;
at least one stator winding wound on the stator core for generating a magnetic field for driving the rotor;
a plurality of terminals secured to the stator core and extending away from the stator core, and having first ends and medial portions adjacent the first ends, said first ends being smaller in at least one dimension than the medial portions;
the winding having ends electrically connected to preselected terminals;
a printed circuit board;
motor energization circuit means on the printed circuit board;
openings in the board conforming in size and location to the first ends of the terminals on the stator core but being smaller than the medial portions of the terminals;
said openings receiving the first ends of terminals therethrough but not the terminal medial portions, wherein when received the stator core is seated at a selected location relative to the board with the medial portion abutting the board; and
conductors on the side of the board remote from the stator having solder connections to the preselected terminals on the stator core and to electrical connection means of components of the circuit means.

2. The motor according to claim 1 wherein welded connections to the terminals electrically connect the ends of the windings and the preselected terminals.

3. The motor according to claim 2 wherein the preselected terminals have tangs overlying winding ends, and the tangs are welded to the winding ends.

4. The motor according to claim 1 wherein the stator core has socket means secured thereto receiving second ends of the terminals opposite said first ends.

5. The motor according to claim 4 wherein an insulator on the stator core has said socket means integrally formed thereon, projecting toward the printed circuit board, and receiving the second ends of the terminals in closely fitting openings therein.

6. The motor according to claim 5 wherein the second ends of the terminals received in the openings in the socket means are barbed to prevent dislocation.

7. The motor according to claim 5 wherein the insulator is one of two insulators on the stator core substantially covering the core and insulating the winding from the stator core where the core and winding adjoin.

8. The motor according to claim 1 wherein:
the motor is a brushless DC motor having a permanent magnet rotor with field magnet means to interact with the stator core to develop torque therebetween, and commutation magnet means; and
a Hall device mounted on the circuit board and electrically connected with the circuit thereon, the Hall device being aligned with the commutation magnet means of the rotor.

9. The motor according to claim 1 wherein each terminal first end has a width smaller than the medial portion to form two shoulders at opposite lateral edges of the terminal, and wherein cutouts are also formed in the terminal edges adjacent said shoulders.

10. The motor according to claim 1 wherein the printed circuit board has a selected thickness and wherein each of the terminal first ends have a length longer than the circuit board thickness so that the first ends extend from the remote side of the board a selected amount.

11. A motor comprising:
a stator core;
a rotor mounted for rotation relative to the stator core;
at least one stator winding wound on the stator core for generating a magnetic field for driving the rotor;
an insulator secured to the stator core and having socket means integrally formed thereon and defining openings extending away from the stator core;
a plurality of terminals having first ends extending away from the stator core and second ends closely fitted into openings of said insulator, said second ends being barbed to prevent dislocation;
the winding having ends electrically connected to preselected terminals;
a printed circuit board;
motor energization circuit means on the printed circuit board;
openings in the board conforming in size and location to the terminal first ends, said openings receiving the terminal first ends therethrough; and
conductors on the side of the board remote from the stator having solder connections to the preselected terminals on the stator core and to electrical connection means of components of the circuit means.

12. A motor comprising:
a stator core;
a rotor mounted for rotation relative to the stator core;
at least one stator winding wound on the stator core for generating a magnetic field for driving the rotor;
a plurality of terminals having first ends extending away from the stator core and second ends ecured to the stator core, each terminal having a tang at a medial portion of said terminal between said two ends;
the winding having ends welded beneath tangs of preselected terminals and without encircling said terminals;
a printed circuit board;
motor energization circuit means on the printed circuit board;
openings in the board conforming in size and location to the terminal first ends, said openings receiving the terminal first ends therethrough; and
conductors on the side of the board remote from the stator having solder connections to the preselected terminals on the stator core and to electrical connection means of components of the circuit means.

* * * * *